(12) United States Patent
Zhang

(10) Patent No.: US 9,372,863 B2
(45) Date of Patent: Jun. 21, 2016

(54) METHOD, APPARATUS AND SYSTEM FOR UPDATING METADATA FILE

(71) Applicant: Huawei Technologies Co., Ltd., Shenzhen (CN)

(72) Inventor: Shaobo Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 13/715,339

(22) Filed: Dec. 14, 2012

(65) Prior Publication Data

US 2013/0103642 A1   Apr. 25, 2013

Related U.S. Application Data

(63) Continuation of application No. PCT/CN2011/074978, filed on May 31, 2011.

(30) Foreign Application Priority Data

Jun. 15, 2010  (CN) .......................... 2010 1 0208033

(51) Int. Cl.
 *G06F 17/30* (2006.01)
 *H04L 29/08* (2006.01)

(52) U.S. Cl.
 CPC ...... *G06F 17/3012* (2013.01); *G06F 17/30056* (2013.01); *H04L 67/02* (2013.01)

(58) Field of Classification Search
 None
 See application file for complete search history.

(56) References Cited

U.S. PATENT DOCUMENTS

| | | | |
|---|---|---|---|
| 7,367,043 B2 | 4/2008 | Dudkiewicz et al. | |
| 2002/0092031 A1 | 7/2002 | Dudkiewicz et al. | |
| 2003/0112268 A1* | 6/2003 | Wettach ........................ | 345/731 |
| 2004/0199657 A1 | 10/2004 | Eyal et al. | |
| 2005/0210501 A1 | 9/2005 | Zigmond et al. | |
| 2007/0157283 A1 | 7/2007 | Setlur et al. | |
| 2008/0097970 A1 | 4/2008 | Olstad et al. | |
| 2008/0162716 A1 | 7/2008 | Kayanuma et al. | |
| 2008/0181581 A1 | 7/2008 | Aratani et al. | |

(Continued)

FOREIGN PATENT DOCUMENTS

| | | |
|---|---|---|
| CN | 101005546 A | 7/2007 |
| CN | 101237552 A | 8/2008 |

(Continued)

OTHER PUBLICATIONS

International Searching Report issued in corresponding PCT Patent Application No. PCT/CN2011/074978, mailed Sep. 1, 2011.

(Continued)

*Primary Examiner* — Bai D. Vu
(74) *Attorney, Agent, or Firm* — Brinks Gilson & Lione

(57) ABSTRACT

The present invention discloses a method, an apparatus, and a system for updating a metadata file. The method include: sending a message to a server on a network side to request a metadata file corresponding to media presentation; receiving a metadata file returned by the server according to the message that requests the metadata file corresponding to the media presentation, where the metadata file includes information about duration of a part of described media presentation; determining update time of the metadata file according to the information about the duration of the part of described media presentation; and sending a request for updating the metadata file to the server according to the update time.

21 Claims, 9 Drawing Sheets

(56) References Cited

U.S. PATENT DOCUMENTS

| | | | |
|---|---|---|---|
| 2008/0195746 | A1 | 8/2008 | Bowra et al. |
| 2009/0172720 | A1 | 7/2009 | Kiiskinen et al. |
| 2009/0249222 | A1* | 10/2009 | Schmidt et al. .............. 715/751 |
| 2009/0319557 | A1 | 12/2009 | Lipka et al. |
| 2010/0235528 | A1* | 9/2010 | Bocharov et al. ............. 709/231 |
| 2011/0022471 | A1* | 1/2011 | Brueck et al. ............... 705/14.61 |
| 2011/0099594 | A1* | 4/2011 | Chen ................ H04N 21/23439 725/105 |
| 2011/0125919 | A1* | 5/2011 | Kwon et al. .................. 709/231 |
| 2011/0314174 | A1* | 12/2011 | Joung et al. ................... 709/231 |
| 2012/0218970 | A1* | 8/2012 | Westberg et al. ............. 370/331 |
| 2014/0189146 | A1* | 7/2014 | Keum et al. ................... 709/231 |

FOREIGN PATENT DOCUMENTS

| | | |
|---|---|---|
| CN | 101282348 A | 10/2008 |
| CN | 101516057 A | 8/2009 |
| EP | 1578126 A2 | 9/2005 |
| JP | 2005-006203 | 1/2005 |
| JP | 2005-304013 A | 10/2005 |
| JP | 2006-018506 | 1/2006 |
| JP | 2008-165656 A | 7/2008 |
| JP | 2009282950 A | 12/2009 |
| WO | WO 2008/045305 A2 | 4/2008 |
| WO | WO 2009083784 A1 | 7/2009 |

OTHER PUBLICATIONS

Written Opinion of the International Searching Authority issued in corresponding PCT Patent Application No. PCT/CN2011/074978, mailed Sep. 1, 2011.

Nokia Corporation, "Dynamic HTTP Streaming" 3GPP TSG-SA4 MBS Ad-hoc, Sep. 28-Oct. 1, 2009. Seattle, USA, S4-AHI070.

Research in Motion UK Limited, "Tuning into a Live HTTP Stream with Client Controlled Adaptation" Agenda Item 8, 3GPP TSG-SA4 #55, Aug. 17-21, 2009. S4-090649.

Qualcomm Inc, et al., "Updates to Adaptive HTTP Streaming" Change Request, 26.234 CR 0166 rev. 4, 9.1.0. 3GPP TSG-SA4 MBS Adhoc #6. Aachen, Germany, Mar. 2-4, 2010.

Qualcomm Inc., "Pseudo CR: Adaptive HTTP Streaming—Full Solution Proposal" Agenda Item 6, 3GPP TSG-SA4 #57. St. Julians, Malta, Jan. 25-29, 2010. S4-100060.

Qualcomm Europe S.A.R.L, "Adaptive HTTP Streaming: Changes to Media Presentations" 3GPP TSG-SA4 AHI Meeting. Paris, France, Dec. 14-16, 2009. S4-AHI0134.

Lte, "3$^{rd}$ Generation Partnership Project; Technical Specification Group Services and System Aspects; Transparent end-to-end Packet-switched Streaming Service (PSS); Protocols and Codecs" (Release 9) 3GPP TS 26.234. V9.2.0, Mar. 2010.

Office Action issued in corresponding Chinese Patent Application No. 201010208033.7, mailed Jun. 20, 2013, 18 pages.

Extended European Search Report issued in corresponding European Patent Application No. 11795093.1, mailed May 14, 2013.

Lte, "3$^{rd}$ Generation Partnership Project; Technical Specification Group Services and System Aspects; Transparent end-to-end Packet-switched Streaming Service (PSS); Protocols and codecs" (Release 9) 3GPP TS 26.234, V9.3.0, Jun. 2010, 182 pages.

Huawei Technologies Co., Ltd., "Live Content Support in Static HTTP Streaming" Agenda Item 6, 3GPP TSG-SA4 #56, Sophia-Antipolis, France, Nov. 9-13, 2009, S4-090857, 6 pages.

Stockhammer et al., WD 0.1 of 23001-6 Dynamic Adaptive Streaming over HTTP (DASH) MPEG-4 Systems, International Organisation for Standardisation, 23001-6 WD (DASH), Jul. 30, 2010, 16 pages.

* cited by examiner

METHOD, APPARATUS AND SYSTEM FOR UPDATING METADATA FILE

CROSS-REFERENCE TO RELATED APPLICATION

This application is a continuation of International Application No. PCT/CN2011/074978, filed on May 31, 2011, which claims priority to Chinese Patent Application No. 201010208033.7, filed on Jun. 15, 2010, both of which are hereby incorporated by reference in their entireties.

FIELD OF THE INVENTION

The present invention relates to the communication field, and in particular, to a method, an apparatus, and a system for updating a metadata file.

BACKGROUND OF THE INVENTION

In a streaming service based on a Hyper Text Transfer Protocol (Hyper Text Transfer Protocol, HTTP), a method of obtaining the streaming service by a user equipment (User Equipment, UE) includes: The UE sends a message to a server on a network side to request a metadata file corresponding to media presentation, receives a metadata file returned by the server, determines a media fragment corresponding to the described media presentation according to the media presentation description information included in the metadata file, and obtains and plays the media fragment.

When the media presentation is a live program, the end time of the live program cannot be determined beforehand, the server keeps updating the metadata file corresponding to the live program with elapse of time. To obtain a complete live program, the UE needs to keep updating the metadata file corresponding to the live program.

Currently, the UE updates the metadata file periodically. When the update period of the metadata file is set improperly, the UE may fail to normally obtain a streaming service. For example, as shown in FIG. 1, when the update period of the metadata file is set to a too large value, information about a part of media presentation (a media fragment 4 shown in FIG. 1) described by metadata file 2 is lost in the duration between t0 and t1, where t0 is the first time of updating the metadata file and t1 is the second time of updating the metadata file. Consequently, the UE is unable to obtain normal streaming service according to the metadata file 1 obtained in the first time of update and the metadata file 2 obtained in the second time of update.

SUMMARY OF THE INVENTION

Embodiments of the present invention provide a method, an apparatus, and a system for updating a metadata file, so that a user equipment can accurately determine the time of updating the metadata file and ensure that a user can obtain a streaming service normally.

In one aspect, a method for updating a metadata file is provided, including: sending a message to a server on a network side to request a metadata file corresponding to media presentation; receiving a metadata file returned by the server according to the message that requests the metadata file corresponding to the media presentation, where the metadata file includes information about duration of a part of described media presentation; determining update time of the metadata file according to the information about the duration of the part of described media presentation; and sending a request for updating the metadata file to the server according to the update time.

In another aspect, a method for updating a metadata file is provided, including: generating a metadata file corresponding to media presentation, where the metadata file includes information about duration of a part of described media presentation; and sending the metadata file to a user equipment if a message that requests the metadata file corresponding to the media presentation is received from the user equipment, where the user equipment determines update time of the metadata file according to the information about the duration of the part of described media presentation.

In another aspect, a user equipment is provided, including:
a sending module, configured to send a message to a server on a network side to request a metadata file corresponding to media presentation;
a receiving module, configured to receive a metadata file returned by the server according to the message that requests the metadata file corresponding to the media presentation, where the metadata file includes information about duration of a part of described media presentation;
a determining unit, configured to determine update time of the metadata file according to the information about the duration of the part of described media presentation, where the information is included in the metadata file received by the receiving module; and
an updating module, configured to send a request for updating the metadata file to the server according to the update time determined by the determining module.

In another aspect, a server is provided, including:
a generating module, configured to generate a metadata file corresponding to media presentation, where the metadata file includes information about duration of a part of described media presentation; and
a sending module, configured to send the metadata file generated by the generating module to a user equipment if a message that requests the metadata file corresponding to the media presentation is received from the user equipment, where the user equipment determines update time of the metadata file according to the information about the duration of the part of described media presentation.

In another aspect, a communication system is provided, including:
a server, configured to: generate a metadata file corresponding to media presentation, where the metadata file includes information about duration of a part of described media presentation; send the metadata file to a user equipment if a message that requests the metadata file corresponding to the media presentation is received from the user equipment; and
the user equipment, configured to: send the message to the server to request the metadata file corresponding to the media presentation; receive a metadata file returned by the server; determine update time of the metadata file according to the information about the duration of the part of described media presentation, where the information is included in the metadata file; and send a request for updating the metadata file to the server according to the update time.

In the method, apparatus and system for updating the metadata file in the embodiments of the present invention, the information about the duration of the part of described media presentation is added in the metadata file, so that the user equipment can accurately determine, according to the information about the duration of the part of described media presentation, the time of updating the metadata file, so as to solve the following problem that: Improper setting of the update period makes the user equipment fail to normally obtain a streaming service when the metadata file is updated periodically in the prior art.

Embodiments of the present invention further provide a method, an apparatus, and a system for updating a metadata file, so that a user equipment can accurately determine the time of updating the metadata file and ensure that a user can normally obtain a streaming service.

In one aspect, a method for updating a metadata file is provided, including: sending a message to a server on a network side to request a metadata file corresponding to media presentation; receiving a metadata file returned by the server according to the message that requests the metadata file corresponding to the media presentation, where the metadata file includes information about time of updating the metadata file by the server and information indicated to a user equipment about a time length of updating the metadata file; determining a time range of updating the metadata file, according to the information about the time of updating the metadata file by the server and the information indicated to the user equipment about the time length of updating the metadata file; selecting update time of the metadata file in the time range of updating the metadata file; and sending a request for updating the metadata file to the server according to the update time.

In another aspect, a method for updating a metadata file is provided, including: generating a metadata file corresponding to media presentation, where the metadata file includes information about time of updating the metadata file by a server and information indicated to a user equipment about a time length of updating the metadata file; and sending the metadata file to the user equipment if a message that requests the metadata file corresponding to the media presentation is received from the user equipment, where the user equipment determines update time of the metadata file according to the information about the time of updating the metadata file by the server and the information indicated to the user equipment about the time length of updating the metadata file.

In another aspect, a user equipment is provided, including:

a sending module, configured to send a message to a server on a network side to request a metadata file corresponding to media presentation;

a receiving module, configured to receive a metadata file returned by the server according to the message that requests the metadata file corresponding to the media presentation, where the metadata file includes information about time of updating the metadata file by the server and information indicated to a user equipment about a time length of updating the metadata file;

a determining module, configured to determine a time range of updating the metadata file, according to the information about the time of updating the metadata file by the server and the information indicated to the user equipment about the time length of updating the metadata file;

a selecting module, configured to select update time of the metadata file in the time range of updating the metadata file, where the time range is determined by the determining module; and an updating module, configured to send a request for updating the metadata file to the server according to the update time selected by the selecting module.

In another aspect, a server is provided, including:

a generating module, configured to generate a metadata file corresponding to media presentation, where the metadata file includes information about time of updating the metadata file by a server and information indicated to a user equipment about a time length of updating the metadata file; and a sending module, configured to send the metadata file to the user equipment if a message that requests the metadata file corresponding to the media presentation is received from the user equipment, where the user equipment determines update time of the metadata file according to the information about the time of updating the metadata file by the server and the information indicated to the user equipment about the time length of updating the metadata file.

In another aspect, a communication system is provided, including:

a server, configured to: generate a metadata file corresponding to media presentation, where the metadata file includes information about time of updating the metadata file by a server and information indicated to a user equipment about a time length of updating the metadata file; and send the metadata file to the user equipment if a message that requests the metadata file corresponding to the media presentation is received from the user equipment; and the user equipment, configured to: send the message to the server to request the metadata file corresponding to the media presentation; receive a metadata file returned by the server; determine a time range of updating the metadata file, according to the information about the time of updating the metadata file by the server and the information indicated to the user equipment about the time length of updating the metadata file, where the two pieces of information is included in the metadata file; select update time of the metadata file in the time range of updating the metadata file; and send a request for updating the metadata file to the server according to the update time.

In the method, apparatus and system for updating the metadata file in the embodiments of the present invention, the information about the time of updating the metadata file by the server and the information indicated to the user equipment about the time length of updating the metadata file are added in the metadata file, so that the user equipment can accurately determine the time of updating the metadata file, according to the information about the time of updating the metadata file by the server and the information indicated to the user equipment about the time length of updating the metadata file; so as to solve the following problem that: Improper setting of the update period makes the user equipment fail to normally obtain a streaming service when the metadata file is updated periodically in the prior art.

BRIEF DESCRIPTION OF THE DRAWINGS

To illustrate the technical solutions in embodiments of the present invention or the prior art more clearly, the following outlines the accompanying drawings for describing the embodiments of the present invention or the prior art. Apparently, the accompanying drawings outlined below are only about some embodiments of the present invention, and persons of ordinary skill in the art can derive other drawings from the accompanying drawings herein without making any creative effort.

DETAILED DESCRIPTION OF THE EMBODIMENTS

The technical solutions of embodiments of the present invention are described clearly and comprehensively with reference to the accompanying drawings of the embodiments of the present invention. Evidently, the embodiments to be described are merely some embodiments rather than all embodiments of the present invention. All other embodiments, which can be derived by those skilled in the art from the embodiments given herein without any creative effort, shall fall within the scope of the present invention.

To overcome incapability of the prior art in determining accurately update time of a metadata file, embodiments of the present invention provide a method, an apparatus, and a system for updating a metadata file.

Figure 1:
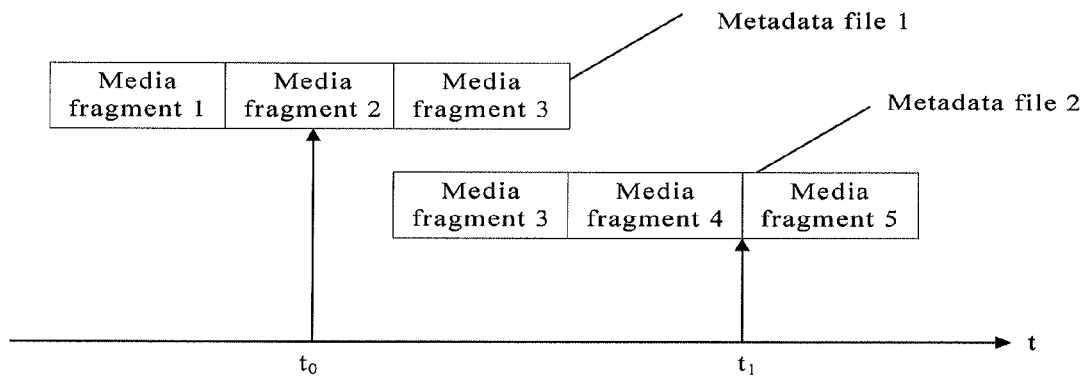
FIG. 1 is a schematic diagram of updating a metadata file in the prior art.
Figure 2:
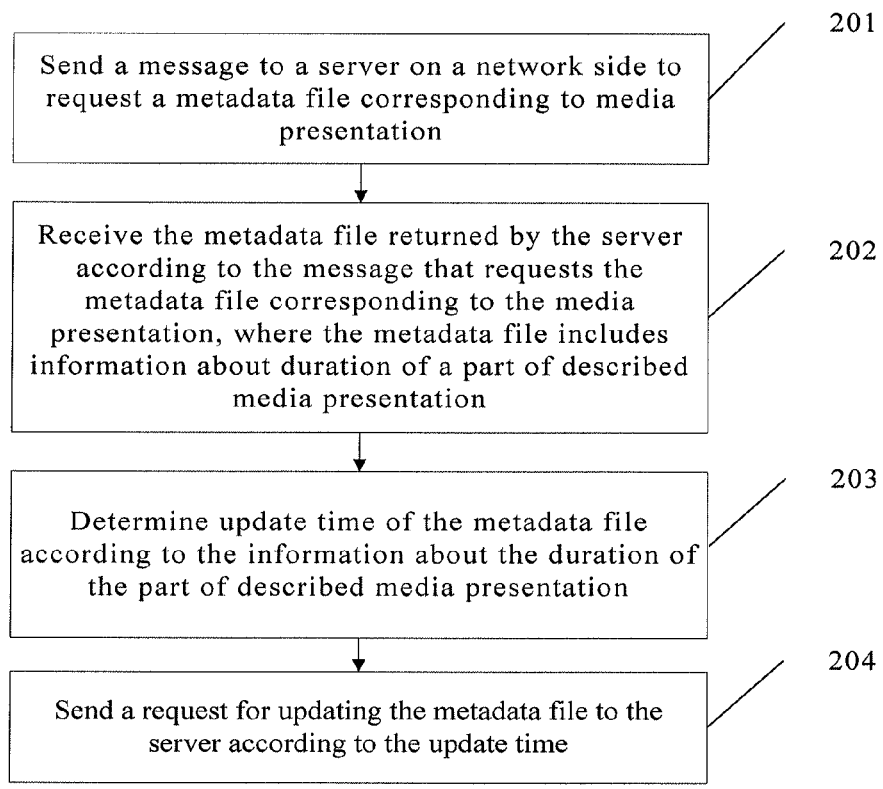
FIG. 2 is a flowchart of a method for updating a metadata file according to an embodiment of the present invention.

As shown in FIG. 2, a method for updating a metadata file according to an embodiment of the present invention includes the following steps:

Step 201: Send a message to a server on a network side to request a metadata file corresponding to media presentation.

In this embodiment, the server on the network side may be a streaming server, or a file server used for generating and storing a metadata file. In a practical application, the server on the network side may also be another server related to the metadata file.

Step 202: Receive a metadata file returned by the server according to the message sent in step 201, where the message is a request for the metadata file corresponding to the media presentation, and the metadata file includes information about duration of a part of described media presentation.

In this embodiment, the part of described media presentation may be all media presentation parts described by the metadata file received in step 202 and a metadata file that is corresponding to the media presentation and is received before the metadata file received in step 202, or may be the media presentation described by the metadata file received in step 202.

In this embodiment, the information about the duration of the part of described media presentation may be expressed by the end time of the part of described media presentation, or expressed by a difference between the end time of the part of described media presentation and the start time of entire media presentation, or expressed by a difference between the end time of the part of described media presentation and the start time of the metadata file received in step 202. Definitely, in a practical application, the information about the duration of the part of described media presentation may be expressed in other modes, which are not detailed herein.

In this embodiment, when the method for updating the metadata file in this embodiment is applied under HTTP Streaming (HTTP Streaming) service protocol architecture of the Third-generation Partnership Project (3GPP), the metadata file is a media presentation description (Media Presentation Description, MPD) file; in other protocols, the metadata file may also be called a manifest file (manifest file).

Step 203: Determine update time of the metadata file according to the information about the duration of the part of described media presentation.

Step 204: According to the update time determined in step 203, send, to the server, a request for updating the metadata file received in step 202.

In the method for updating the metadata file according to the embodiment of the present invention, the time of updating the metadata file can be determined accurately according to the information that is included in the metadata file and is about the duration of the part of described media presentation, so as to solve the following problem that: Improper setting of the update period makes the user equipment fail to normally obtain a streaming service when the metadata file is updated periodically in the prior art.

Figure 3:
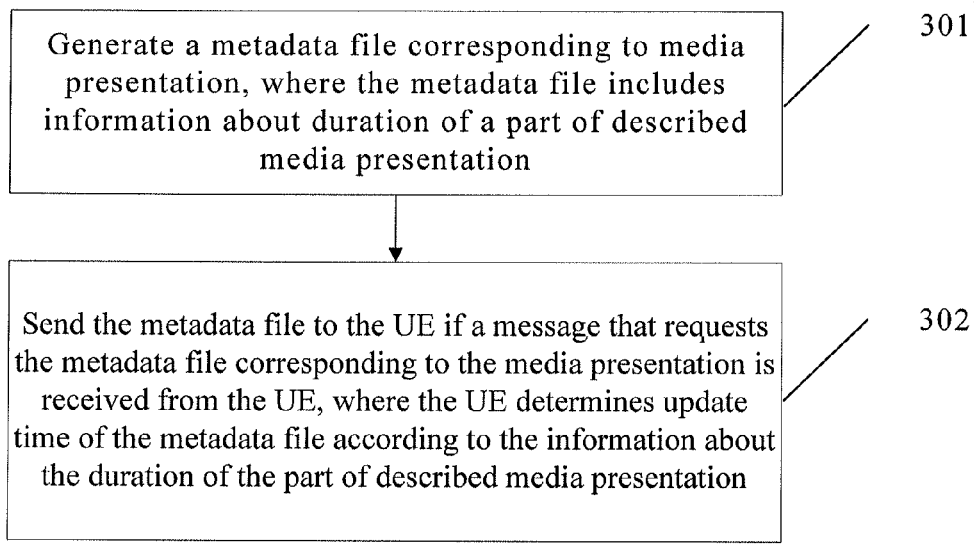
FIG. 3 is a flowchart of a method for updating a metadata file according to another embodiment of the present invention.

As shown in FIG. 3, another embodiment of the present invention provides a method for updating a metadata file. The method includes the following steps:

Step 301: Generate a metadata file corresponding to media presentation, where the metadata file includes information about duration of a part of described media presentation.

Step 302: Send the metadata file to a UE if a message that requests the metadata file corresponding to the media presentation is received from the UE, where the UE determines update time of the metadata file according to the information about the duration of the part of described media presentation.

In the method for updating the metadata file according to the embodiment of the present invention, the information about the duration of the part of described media presentation is added in the metadata file, so that the UE can determine accurately the time of updating the metadata file, according to the information about the duration of the part of described media presentation, so as to solve the following problem that: Improper setting of the update period makes the user equipment fail to normally obtain a streaming service when the metadata file is updated periodically in the prior art.

To make persons skilled in the art better understand the technical solutions of the present invention, the following gives more details about the method for updating the metadata file provided in the embodiment of the present invention, by taking an example that the embodiment of the present invention is applied under a 3GPP protocol architecture.

Figure 4:
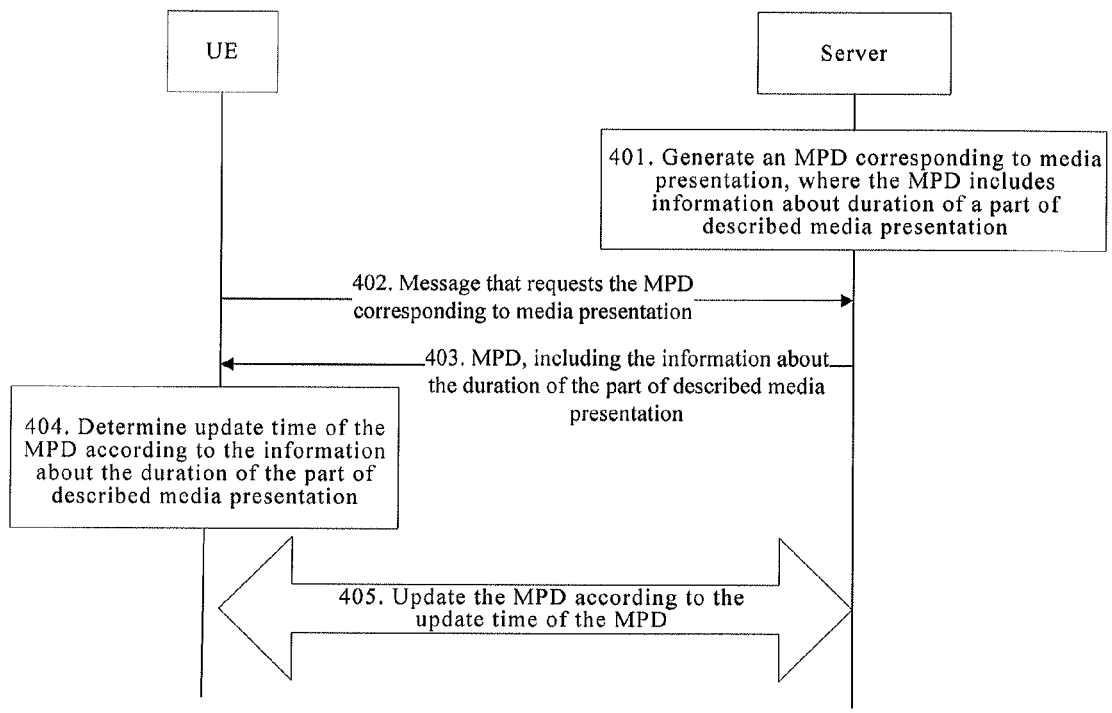
FIG. 4 is a sequence diagram of a method for updating a metadata file according to another embodiment of the present invention.

As shown in FIG. 4, a method for updating a metadata file according to another embodiment of the present invention includes the following steps:

Step 401: A server generates an MPD corresponding to media presentation, where the MPD includes information about duration of a part of described media presentation.

In this embodiment, the media presentation is a live program. The server generates two or more MPDs for the media presentation. Specifically, the server may generate two or more MPDs for the media presentation at the same interval of update time, or generate two or more MPDs for the media presentation at different intervals of update time.

Figure 5:
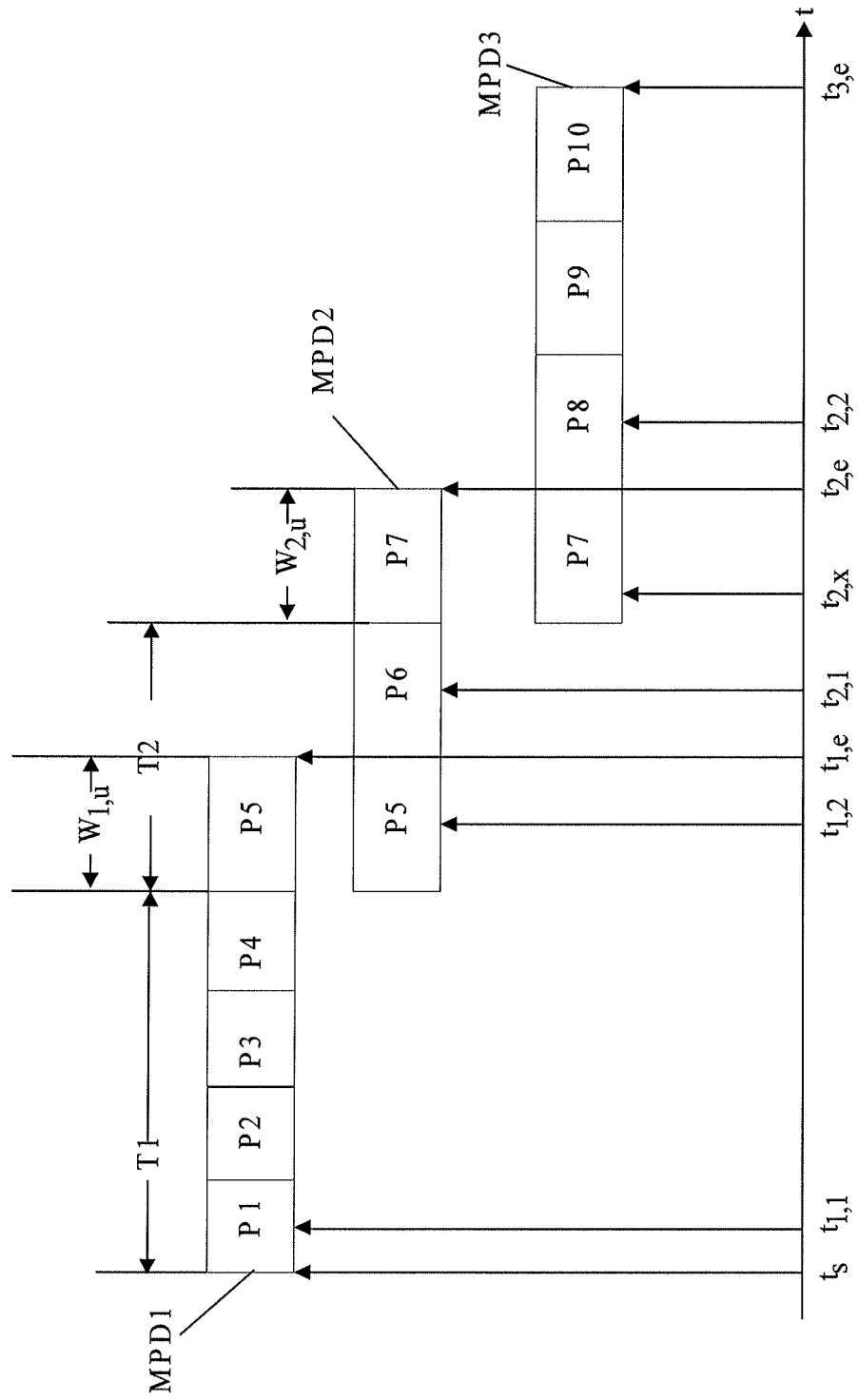
FIG. 5 is a schematic diagram of using a method for updating a metadata file provided in an embodiment of the present invention to update MPD.

In this embodiment, a case shown in FIG. 5 is taken as an example. As shown in FIG. 5, the media presentation includes 10 media fragments (P1-P10), and the server generates three versions of the metadata file (MPD1, MPD2, and MPD3) for the media presentation at different intervals of update time. At the time of updating the metadata file, a next MPD replaces a previous MPD, namely, MPD(i) replaces MPD(i−1), where i=2 or 3. MPD1 is used to describe P1-P5, MPD2 is used to describe P5-P7, MPD3 is used to describe P7-P10, and the interval of update time between MPD1 and MPD2 is T1 (T1 is duration from P1 to P4), and the interval of update time between MPD2 and MPD3 is T2 (T2 is duration from P5 to P6).

It should be noted that, in order to ensure continuity of media fragments described by the MPD, when the server generates MPDs for the media presentation, an overlap area (namely, overlap time) needs to be set between any two adjacent MPDs. As shown in FIG. 5, the overlap area between MPD1 and MPD2 is $W_{1,u}$ ($W_{1,u}$ is a duration area of P5), and the overlap area between MPD2 and MPD3 is $W_{2,u}$ ($W_{2,u}$ is a duration area of P7). Media fragments included in the overlap area may be described in an updated MPD explicitly. For example, as shown in FIG. 5, the description information of P5 is carried in MPD2 explicitly. Media fragments included in the overlap area may also be described in the updated MPD implicitly. For example, as shown in FIG. 5, the description information of P7 is not carried in MPD3, and the description information of P7 is obtained from MPD2.

In this embodiment, the part of described media presentation may be all media presentation parts described by a current MPD generated by the server and an MPD prior to the MPD. For example, as shown in FIG. 5, if MPD2 is the MPD currently generated by the server, the part of described media presentation is P1-P7, and the part of described media presentation may also be a part of media presentation described by the current MPD generated by the server. For example, as shown in FIG. 5, if MPD2 is the MPD currently generated by the server, the part of described media presentation is P5-P7.

In the embodiment, an example that the part of described media presentation is all media presentation parts described by the current MPD generated by the server and an MPD prior to the MPD is taken for illustration.

In the embodiment, the information about the duration of the part of described media presentation may be expressed by the end time of the part of described media presentation. The end time of the part of described media presentation may be expressed by Universe Time Coordinated UTC or time of the server. For example, as shown in FIG. 5, the duration of the part of described media presentation included in MPD1 is $t_{1,e}$, the duration of the part of described media presentation included in MPD2 is $t_{2,e}$ and the duration of the part of described media presentation included in MPD3 is $t_{3,e}$.

The duration of the part of described media presentation may also be expressed by a difference between the end time of the part of described media presentation and the start time of entire media presentation. For example, as shown in FIG. 5, the duration of the part of described media presentation included in MPD1 is $t_{1,e}-t_s$, the duration of the part of described media presentation included in MPD2 is $t_{2,e}-t_s$ and the duration of the part of described media presentation included in MPD3 is $t_{3,e}-t_s$.

Definitely, in a practical application, the duration of the part of described media presentation may be expressed in other modes, which are not detailed herein.

It should be noted that if the end time of the part of described media presentation is expressed by the time of the server, a UE needs to set up a time synchronization relationship with the server beforehand.

Further, when the information about the duration of the part of described media presentation is expressed by the end time of the part of described media presentation, the information about the duration of the part of described media presentation is expressed by an endPresentationTimeDescribed field; when the information about the duration of the part of described media presentation is expressed by a difference between the end time of the part of described media presentation and the start time of the entire media presentation, the information about the duration of the part of described media presentation is expressed by a mediaPresentationDurationDescribed field.

Further, when the MPD is a last MPD corresponding to the media presentation, the information about the duration of the part of described media presentation may also be expressed by an endTimePresentation field.

Optionally, to enable the UE to more accurately determine the time of updating the MPD by the UE and to avoid a waste of network communication resources and information processing resources of the server due to repeated requests for the same MPD, the MPD in this embodiment may also include information about the time length of updating the MPD and/or information about a time interval of updating the MPD by the server.

The information about the time length of updating the MPD is used to indicate the time length of updating the MPD by the UE, so that the UE can determine, according to the information about the time length of updating the MPD, the time range of updating the MPD. The information about the time interval of updating the MPD by the server is used to indicate, to the UE, the time length of updating the MPD by the server, so that the UE determines, according to the information about the time interval of updating the MPD by the server, the time range of updating the MPD.

In this embodiment, the server may determine information about the time length of updating the MPD, according to overlap time between a current MPD and an MPD next to the current MPD. For example, as shown in FIG. 5, according to overlap area $W_{1,u}$ ($W_{1,u}$ is a duration area of P5) between MPD1 and MPD2, the server may set the time length of updating the MPD to be any time length greater than 0 and less than or equal to $W_{1,u}$, where the time length of updating the MPD is carried in MPD1.

Optionally, to enable the UE to determine in time whether a received MPD has described the entire media presentation completely and to save network communication resources occupied by the update of the MPD, the MPD may also include information indicating that the media presentation is completely described. The information indicating that the media presentation is completely described is used to indicate, to the UE, that the metadata file has described the media presentation completely, so that the UE stops sending a request for updating the metadata file.

Step 402: When the UE needs to obtain an MPD corresponding to the media presentation, the UE sends a message to the server to request the MPD corresponding to the media presentation.

As shown in FIG. 5, the UE may send the message to the server at time $t_{1,1}$ or $t_{2,1}$ to request the MPD corresponding to the media presentation.

Step 403: The server sends the MPD to the UE according to the received message that requests the MPD corresponding to the media presentation.

As shown in FIG. 5, if the server receives, at time $t_{1,1}$, the message that requests the MPD corresponding to the media presentation and is sent by the UE, the server sends MPD1 to the UE; if the server receives, at time $t_{2,1}$, the message that requests the MPD corresponding to the media presentation and is sent by the UE, the server sends MPD2 to the UE.

Step 404: The UE determines the update time of the MPD according to the information about the duration of the part of described media presentation, where the information is included in the MPD.

In this embodiment, the UE may use the last time of updating the MPD and the time prior to the end time of the part of described media presentation as the update time of the MPD.

Further, if the MPD sent by the server to the UE in step 403 includes information about the time length of updating the current MPD, the UE may determine, according to the information about the time length of updating the current MPD and the information about the duration of the part of described media presentation, the time range of updating the current MPD and select update time of the current MPD randomly in the time range of updating the current MPD.

For example, as shown in FIG. 5, if the MPD sent by the server to the UE at time $t_{1,1}$ is MPD1, MPD1 includes the information about the duration of the part of described media presentation and the information about the time length of updating MPD1. The information about the duration of the part of described media presentation is expressed by the end time of the part of described media presentation. The end time of the part of described media presentation is $t_{1,e}$, and the information about the time length of updating MPD1 is $W_{1,u}$ ($W_{1,u}$ is the duration of P5). In step 404, the UE may determine the time range of updating MPD1 as $[t_{1,e}-W_{1,u}, t_{1,e}]$ according to the information about the duration ($t_{1,e}$) of the part of described media presentation and the information about the time length ($W_{1,u}$) of updating MPD1. The UE may select a time point in $[t_{1,e}-W_{1,u}, t_{1,e}]$ randomly as the update time of MPD1.

Alternatively, if the MPD sent by the server to the UE in step 403 includes information about the time interval of updating the current MPD by the server, the UE may determine predicted update time of the current MPD according to the information about the time interval of updating the current MPD and the time of receiving the current MPD; determine the time range of updating the current MPD, according to the predicted update time of the current MPD and the information about the duration of the part of described media presentation; and select update time of the current MPD randomly in the time range of updating the current MPD.

For example, as shown in FIG. 5, the MPD sent by the server to the UE at time $t_{1,1}$ is MPD1, and MPD1 includes the information about the duration of the part of described media presentation and the information about the time interval of updating MPD1 by the server. The information about the duration of the part of described media presentation is expressed by the end time of the part of described media presentation. The end time of the part of described media presentation is $t_{1,e}$, and the information about the time interval of updating MPD1 by the server is T1 (T1 is duration of P1-P4). In step 404, the UE may determine the predicted update time ($t_{1,2}=t_{1,1}+T1$) of MPD1 according to the information about the time interval (T1) of updating MPD1 by the server and the time ($t_{1,1}$) of receiving MPD1 by the UE. According to the predicted update time ($t_{1,2}=t_{1,1}+T1$) of MPD1 and the information about the duration ($t_{1,e}$) of the part of described media presentation, the UE determines the time range of updating MPD1 as ($t_{1,2}, t_{1,e}$), and selects a time point in ($t_{1,2}, t_{1,e}$) randomly as the update time of MPD1.

Further, if the predicted update time of the current MPD, which is obtained through the foregoing method, is greater than the duration of the part of described media presentation of the current MPD, the UE selects a time point randomly in the preset time range of updating the MPD as update time of the current MPD. The preset time range of updating the MPD falls within the duration of the part of described media presentation of the current MPD.

For example, as shown in FIG. 5, the MPD sent by the server to the UE at time $t_{2,1}$ is MPD2, and MPD2 includes the information about the duration of the part of described media presentation and the information about the time interval of updating MPD2 by the server. The information about the duration of the part of described media presentation is expressed by the end time of the part of described media presentation. The end time of the part of described media presentation is $t_{2,e}$, and the information about the time interval of updating MPD2 by the server is T2 (T2 is duration of P5 and P6). In step 404, the UE may determine the predicted update time ($t_{2,2}=t_{2,1}+T2$) of MPD2 according to the information about the time interval (T2) of updating MPD2 by the server and the time ($t_{2,1}$) of receiving MPD2 by the UE. In this case, $t_{2,2}>t_{2,e}$, the UE selects a time point randomly in the preset time range $[t_{2,x}, t_{2,e}]$ of updating MPD2 as update time of MPD2.

Definitely, in a practical application, the UE may determine the update time of the MPD in other modes according to the information about the duration of the part of described media presentation, where the information is included in the MPD. Each of the modes is not detailed herein.

Step 405: The UE updates the MPD according to the update time of the MPD determined in step 404. The step includes: The UE sends a request for updating the MPD to the server upon arrival of the update time, where in this embodiment, the request for updating the MPD is a message for requesting the MPD corresponding to the media presentation; the UE receives the MPD returned by the server according to the request for updating the MPD, and uses the MPD to update the MPD stored by the UE.

Further, the method for updating the metadata file provided in this embodiment may further include: The UE judges whether the MPD has described the media presentation completely, and the UE stops sending the request for updating the MPD to the server if the MPD has described the media presentation completely.

In this embodiment, judging whether the MPD has described the media presentation completely refers to: judging whether the MPD includes description about all media fragments of the media presentation, or, if the MPD includes description about a part of media fragments of the media presentation, judging whether the description about the part of media fragments includes description about the last media fragment of the media presentation, where other part of media fragments of the media presentation have been described in an MPD prior to the MPD.

In this embodiment, the UE judging whether the MPD has described the media presentation completely includes two modes:

A first mode is: The UE judges whether information indicating that the media presentation has been described completely is included the received MPD. The UE judges, according to a judgment result, whether the MPD has described the media presentation completely, that is, when the information indicating that the media presentation has been described completely is included in the MPD, the UE judges that the MPD has described the media presentation completely; otherwise, the UE judges that the MPD has not described the media presentation completely.

In this embodiment, the information indicating that the media presentation has been described completely may be expressed by an endTimePresentation field. The endTimePresentation field is used to record duration of entire media presentation. The information indicating that the media presentation has been described completely may also be expressed by a flag bit. Definitely, in a practical application, the information indicating that the media presentation has been described completely may also be expressed through other means, which are not detailed herein.

A second mode is: The UE judges whether a message indicating that the media presentation has been described completely is received from the server. If the UE receives, from the server, the message indicating that the media presentation has been described completely, the UE judges that the media presentation has been described completely; otherwise, the media presentation has not been described completely.

In this embodiment, the UE may trigger the server to send a message indicating that the media presentation has been described completely, by sending a message to the server to request the MPD corresponding to the media presentation; or the UE may also trigger the server to send a message indicating that the media presentation has been described completely, by sending a query message to the server. Definitely, in a practical application, the UE may also use other means to trigger the server to send the message indicating that the media presentation has been described completely. The means are not detailed herein.

The embodiment of the present invention does not restrict the specific form of the message indicating that the media presentation has been described completely. In a practical application, the message indicating that the media presentation has been described completely may be an independent control signaling, or may also be a blank media data file, or may be in other forms, which are not detailed herein.

It should be noted that when the UE uses the first mode to judge whether the MPD has described the media presentation completely, the judging step is performed before step 405 shown in FIG. 4; when the UE uses the second mode to judge whether the MPD has described the media presentation completely, the judging step is performed after step 405 shown in FIG. 4.

Further, the method for updating the metadata file provided in the embodiment of the present invention may further include: The UE generates a media fragment list corresponding to the part of described media presentation according to the information that is about the duration of the part of described media presentation and is included in the MPD; and obtains a media fragment in the media fragment list.

In the embodiment, the step that, the UE generates the media fragment list corresponding to the part of described media presentation according to the information that is about the duration of the part of described media presentation and is included in the MPD, and obtains the media fragments in the media fragment list, specifically includes:

First, the UE determines index numbers 1-n of described media fragments according to the information that is about the duration of the part of described media presentation and is included in the MPD and information about duration of the media fragments, where n=int (the information about the duration of the part of described media presentation/the information about the duration of the media fragments), int (x) is a rounding function and represents a maximum integer not greater than x. In this embodiment, x is the information about the duration of the part of described media presentation/the information about the duration of the media fragments.

Then, the UE generates a uniform resource locator corresponding to the media fragments whose index numbers are 1-n, and generates a list of media fragments whose index numbers are 1-n according to the uniform resource locator.

Finally, the UE obtains a corresponding media fragment through the uniform resource locator according to the order of the index numbers.

In the method for updating the metadata file in this embodiment of the present invention, the information about the duration of the part of described media presentation is added in the MPD, so that the UE can determine accurately the time of updating the MPD, according to the information about the duration of the part of described media presentation, so as to solve the following problem that: The UE fails to normally obtain a streaming service when the MPD is updated periodically in the prior art.

Figure 6:
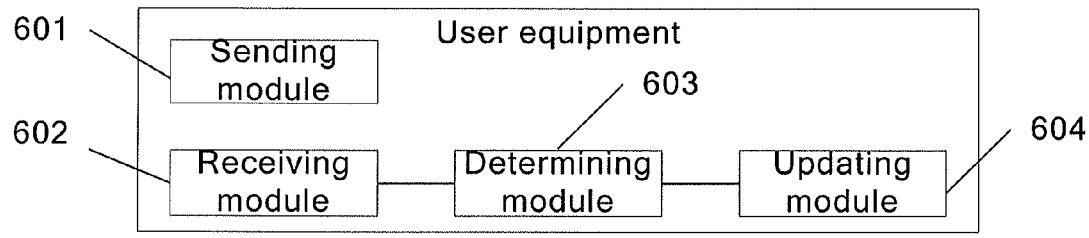
FIG. 6 is a first schematic structural diagram of a user equipment according to an embodiment of the present invention.

As shown in FIG. 6, an embodiment of the present invention provides a user equipment, including:

a sending module 601, configured to send a message to a server on a network side to request a metadata file corresponding to media presentation;

a receiving module 602, configured to receive a metadata file returned by the server according to the message that requests the metadata file corresponding to the media presentation, where the metadata file includes information about duration of a part of described media presentation;

a determining unit 603, configured to determine update time of the metadata file according to the information about the duration of the part of described media presentation, where the information is included in the metadata file received by the receiving module 602; and an updating module 604, configured to send a request for updating the metadata file to the server according to the update time determined by the determining module 603.

Figure 7:
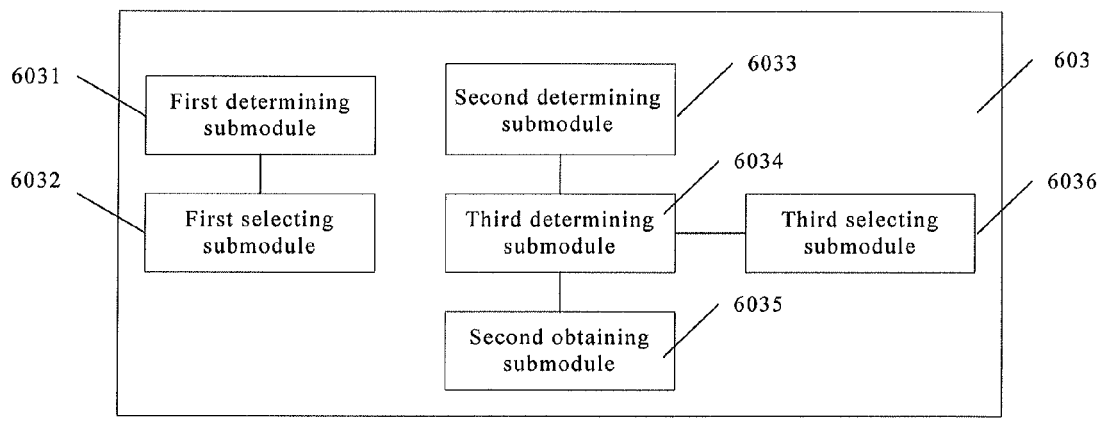
FIG. 7 is a schematic structural diagram of a determining module in the user equipment shown in FIG. 6 according to an embodiment of the present invention.

As shown in FIG. 7, the determining module 603 may further include:

a first determining submodule 6031, configured to obtain, from the metadata file received by the receiving module 602, information about a time length of updating the metadata file, and determine, according to the information about the time length of updating the metadata file and the information about the duration of the part of described media presentation, a time range of updating the metadata file; and a first selecting submodule 6032, configured to select update time of the metadata file in the time range of updating the metadata file, where the time range is determined by the first determining submodule 6031.

As shown in FIG. 7, the determining module 603 may further include:

a second determining submodule 6033, configured to obtain, from the metadata file received by the receiving module 602, information about a time interval of updating the metadata file by the server, and determine predicted update time of the metadata file according to the information about the time interval of updating the metadata file and time of currently receiving the metadata file;

a third determining submodule 6034, configured to determine a time range of updating the metadata file, according to the predicted update time of the metadata file and the information about the duration of the part of described media presentation, where the predicted update time is determined by the second determining submodule 6033; and a second obtaining submodule 6035, configured to select update time of the metadata file in the time range of updating the metadata file, where the time range is determined by the third determining submodule 6034.

As shown in FIG. 7, the determining module 603 may further include:

a third selecting submodule 6036, configured to: select update time of the metadata file in a preset time range of updating the metadata file if the predicted update time of the metadata file, which is determined by the second determining submodule 6034, is greater than the duration of the part of described media presentation, where the preset time range of updating the metadata file falls within the duration of the part of described media presentation.

Figure 8:
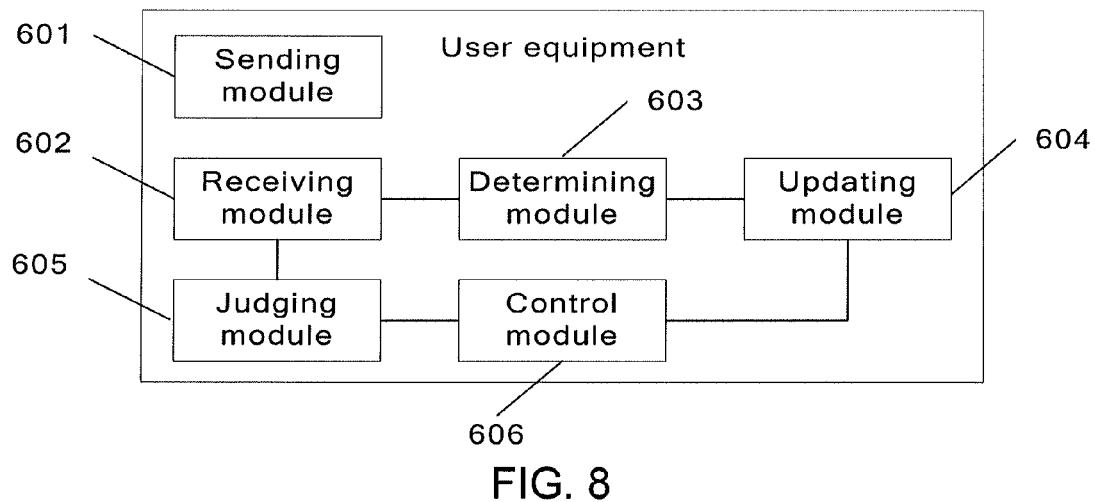
FIG. 8 is a second schematic structural diagram of a user equipment according to an embodiment of the present invention.

As shown in FIG. 8, the user equipment provided in this embodiment may further include:

a judging module 605, configured to judge whether the metadata file received by the receiving module 602 has described the media presentation completely; and a control module 606, configured to control the updating module 604 to stop sending the request for updating the metadata file to the server if the judging module 605 determines that the metadata file has described the media presentation completely.

Specifically, the judging module 605 is further configured to judge that the metadata file has described the media presentation completely if the metadata file includes information indicating that the media presentation has been described completely.

Figure 9:
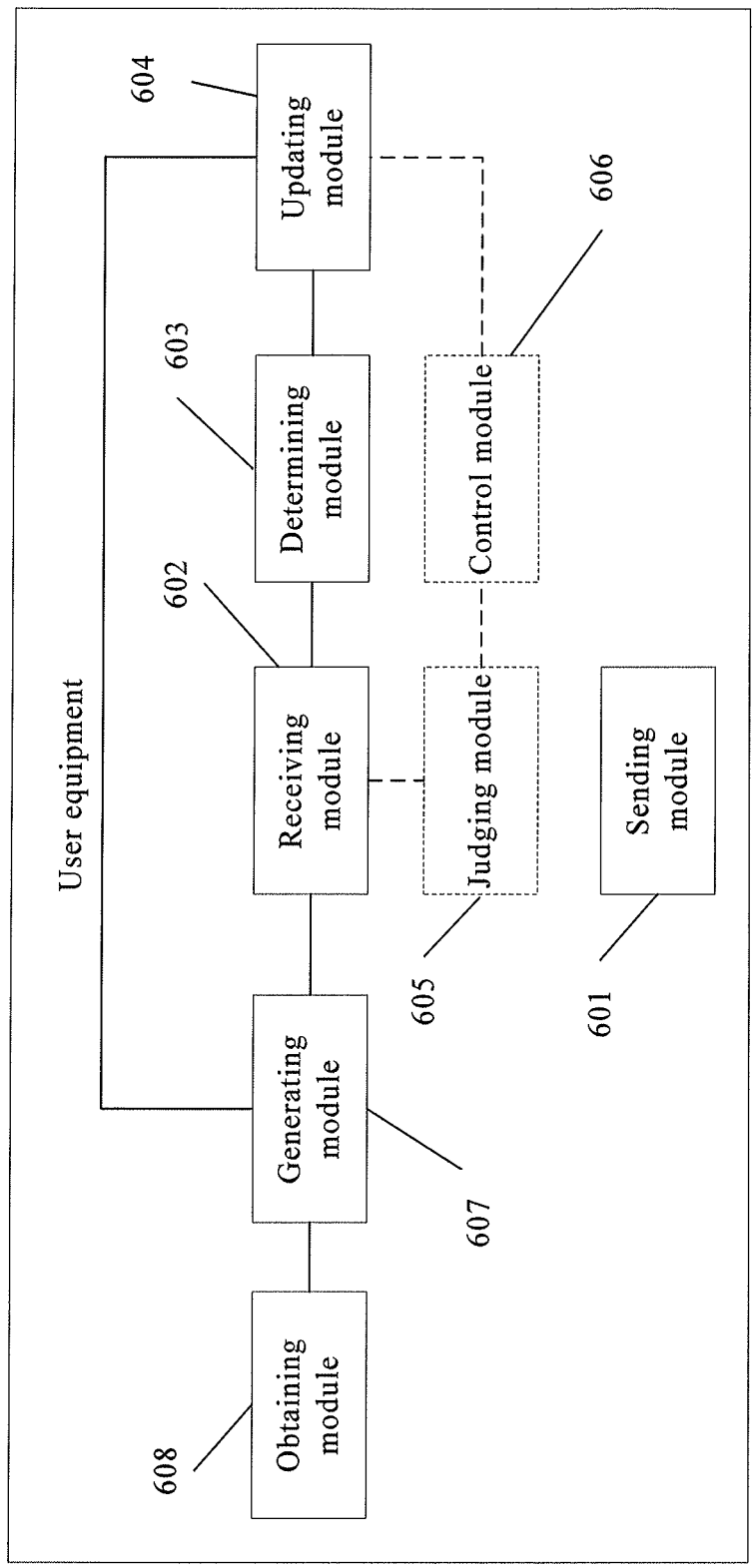
FIG. 9 is a third schematic structural diagram of a user equipment according to an embodiment of the present invention.

As shown in FIG. 9, the user equipment provided in this embodiment may further include:

a generating module 607, configured to generate a media fragment list corresponding to the part of described media presentation according to the information about the duration of the part of described media presentation; and an obtaining module 608, configured to obtain a media fragment in the media fragment list generated by the generating module 607.

For the detailed implementation method of the user equipment provided in the embodiment of the present invention, reference can be made to relevant description about the method for updating the metadata file according to the embodiment of the present invention shown in FIG. 2 to FIG. 5.

It should be noted that in a practical application, multiple modules of the user equipment according to the embodiment of the present invention shown in FIG. 6 to FIG. 9 may also be implemented by one module or functional unit with functions similar to functions of the multiple modules, which is not detailed herein.

Through the user equipment according to the embodiment of the present invention, the time of updating the metadata file can be determined accurately according to the information that is included in the metadata file and is about the duration of the part of described media presentation, so as to solve the following problem that: Improper setting of the update period makes the user equipment fail to normally obtain a streaming service when the metadata file is updated periodically in the prior art.

Figure 10:
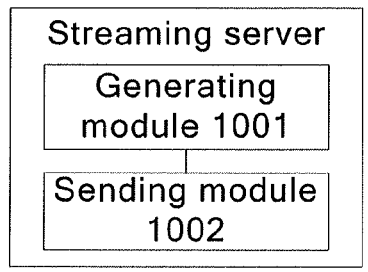
FIG. 10 is a schematic structural diagram of a server according to an embodiment of the present invention.

As shown in FIG. 10, an embodiment of the present invention provides a server, including:

a generating module 1001, configured to generate a metadata file corresponding to media presentation, where the metadata file includes information about duration of a part of described media presentation; and a sending module 1002, configured to send the metadata file generated by the generating module to a user equipment if a message that requests the metadata file corresponding to the media presentation is received from the user equipment, where the user equipment determines update time of the metadata file according to the information about the duration of the part of described media presentation.

For the detailed implementation method of the server provided in the embodiment of the present invention, reference can be made to relevant description about the method for updating the metadata file according to the embodiment of the present invention shown in FIG. 2 to FIG. 5, which is not detailed herein.

It should be noted that in a practical application, multiple modules of the server provided in the embodiment of the present invention shown in FIG. 10 may also be implemented by one module or functional unit with functions similar to functions of the multiple modules, which is not detailed herein.

Through the server provided in the embodiment of the present invention, the information about the duration of the part of described media presentation is added in the metadata file, so that the UE can accurately determine the time of updating the metadata file, according to the information about the duration of the part of described media presentation, so as to solve the following problem that: improper setting of the update period makes the user equipment fail to normally obtain a streaming service when the metadata file is updated periodically in the prior art.

Figure 11:
FIG. 11 is a schematic structural diagram of a communication system according to an embodiment of the present invention.

As shown in FIG. 11, an embodiment of the present invention provides a communication system, including:

a server 1101, configured to: generate a metadata file corresponding to media presentation, where the metadata file includes information about duration of a part of described media presentation; send the metadata file to a user equipment 1102 if a message that requests the metadata file corresponding to the media presentation is received from the user equipment 1102; and the user equipment 1102, configured to: send the message to the server to request the metadata file corresponding to the media presentation; receive a metadata file returned by the server 1101; determine update time of the metadata file according to the information about the duration of the part of described media presentation, where the information is included in the metadata file; and send a request for updating the metadata file to the server according to the update time.

For the detailed implementation method of the communication system provided in the embodiment of the present invention, reference can be made to relevant description about the method and apparatus for updating the metadata file according to the embodiments of the present invention shown in FIG. 2 to FIG. 10.

Through the communication system provided in the embodiment of the present invention, the server adds the information about the duration of the part of described media presentation in the metadata file, so that the UE can accurately determine the time of updating the metadata file, according to the information about the duration of the part of described media presentation, so as to solve the following problem that: The user equipment fail to normally obtain a streaming service when the metadata file is updated periodically in the prior art.

To overcome incapability of the prior art in determining accurately the update time of the metadata file, embodiments of the present invention further provide a method, an apparatus, and a system for updating a metadata file.

Figure 12:
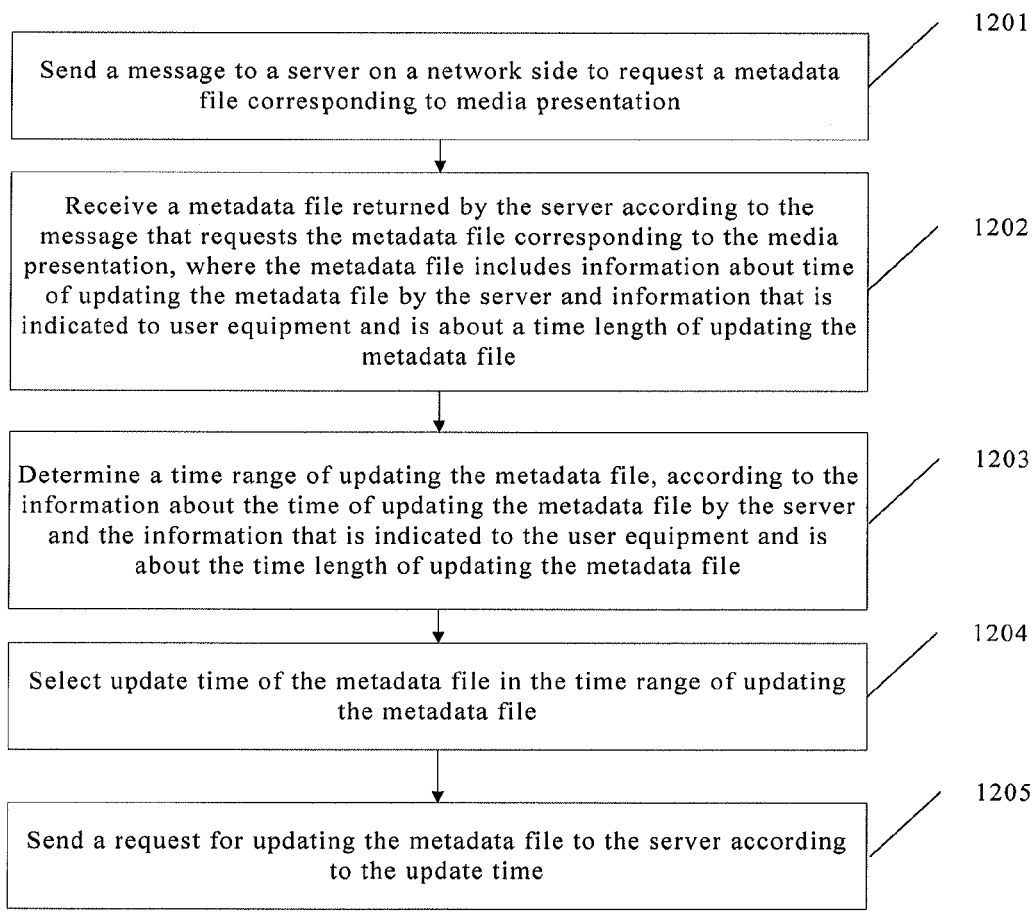
FIG. 12 is a flowchart of a method for updating a metadata file according to an embodiment of the present invention.

As shown in FIG. 12, a method for updating a metadata file in an embodiment of the present invention includes the following steps:

Step 1201: Send a message to a server on a network side to request a metadata file corresponding to media presentation.

In this embodiment, when the method for updating the metadata file in the embodiment of the present invention is applied under an HTTP Streaming protocol architecture of the 3GPP, the metadata file is a media presentation description (Media Presentation Description, MPD) file; in other protocols, the metadata file may also be called a manifest file (manifest file).

Step 1202: Receive a metadata file returned by the server according to the message that requests the metadata file corresponding to the media presentation, where the metadata file includes information about time of updating the metadata file by the server and information indicated to a user equipment about the time length of updating the metadata file.

Step 1203: Determine a time range of updating the metadata file, according to the information about the time of updating the metadata file by the server and the information indicated to the user equipment about the time length of updating the metadata file.

Step 1204: Select update time of the metadata file in the time range of updating the metadata file, where the time range is obtained in step 1203.

Step 1205: According to the update time selected in step 1204, send a request for updating the metadata file to the server.

In the method for updating the metadata file according to the embodiment of the present invention, the information about the time of updating the metadata file by the server and the information indicated to the UE about the time length of updating the metadata file are added in the metadata file, so that the UE can accurately determine the time of updating the metadata file, according to the information about the time of updating the metadata file by the server and the information indicated to the UE about the time length of updating the metadata file, so as to solve the following problem that: improper setting of the update period makes the user equipment fail to normally obtain a streaming service when the metadata file is updated periodically in the prior art.

Figure 13:
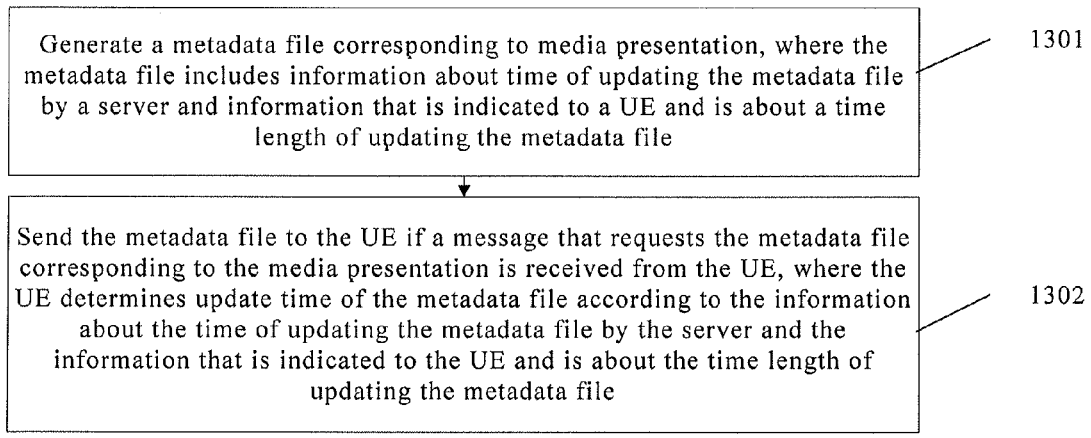
FIG. 13 is a flowchart of a method for updating a metadata file according to another embodiment of the present invention.

As shown in FIG. 13, another embodiment of the present invention provides a method for updating a metadata file. The method includes the following steps:

Step 1301: Generate a metadata file corresponding to media presentation, where the metadata file includes information about time of updating the metadata file by a server and information indicated to a UE about the time length of updating the metadata file.

Step 1302: Send the metadata file to a UE if a message that requests the metadata file corresponding to the media presentation is received from the UE, where the UE determines update time of the metadata file according to the information about the time of updating the metadata file by the server and the information indicated to the UE about the time length of updating the metadata file.

In the method for updating the metadata file according to the embodiment of the present invention, the information about the time of updating the metadata file by the server and the information indicated to the UE about the time length of updating the metadata file are added in the metadata file, so that the UE can determine accurately the time of updating the metadata file, according to the information about the time of updating the metadata file by the server and the information indicated to the UE about the time length of updating the metadata file, so as to solve the following problem that: improper setting of the update period makes the user equipment fail to normally obtain a streaming service when the metadata file is updated periodically in the prior art.

Figure 14:
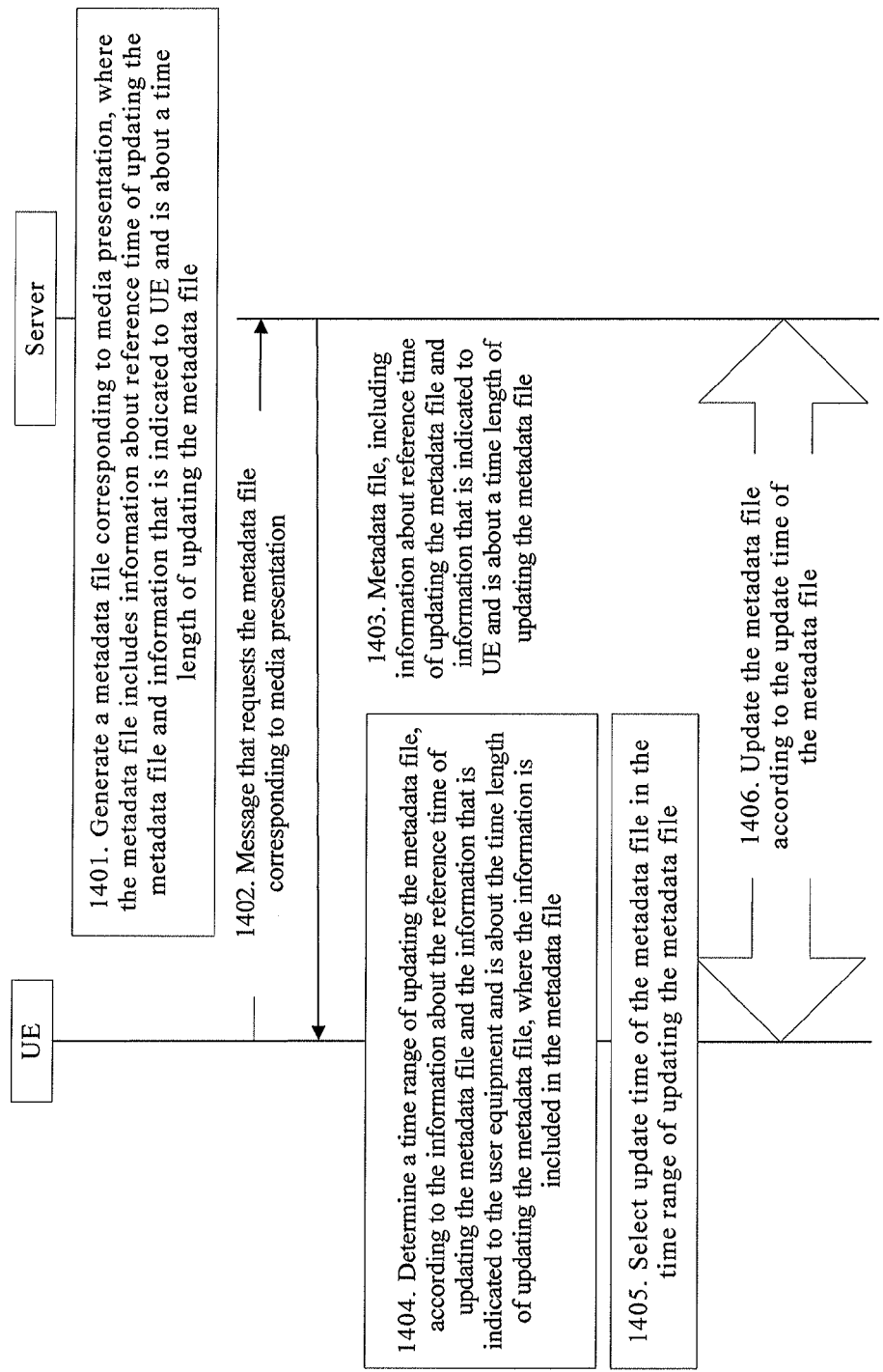
FIG. 14 is a sequence diagram of a method for updating a metadata file according to another embodiment of the present invention.

As shown in FIG. 14, another embodiment of the present invention provides a method for updating a metadata file. The method includes the following steps:

Step 1401: A server generates a metadata file corresponding to media presentation, where the metadata file includes information about reference time of updating the metadata file and information indicated to a UE about a time length of updating the metadata file.

In this embodiment, the information about the reference time of updating the metadata file may be information about time of updating the metadata file by the server, or information about duration of a part of described media presentation.

Further, when the information about the reference time of updating the metadata file is the information about the duration of the part of described media presentation, the information about the duration of the part of described media presentation may be all media presentation parts described by a current metadata file generated by the server and a metadata file prior to the current metadata file, or may be a part of media presentation described by a current metadata file generated by the server.

Further, when the information about the reference time of updating the metadata file is the information about the duration of the part of described media presentation, the information about the duration of the part of described media presentation may be expressed by end time of the part of described media presentation. The end time of the part of described media presentation may be expressed by Universe Time Coordinated UTC or time of the server. The duration of the part of described media presentation may also be expressed by a difference between the end time of the part of described media presentation and start time of entire media presentation, or expressed by a difference between the end time of the part of described media presentation and start time of generating the current metadata file by the server. Definitely, in a practical application, the information about the duration of the part of described media presentation may also be expressed in other modes, which are not detailed herein.

It should be noted that if the end time of the part of described media presentation is expressed by the time of the server, the UE needs to set up a time synchronization relationship with the server beforehand.

Further, when the information about the duration of the part of described media presentation is expressed by the end time of the part of described media presentation, the information about the duration of the part of described media presentation is expressed by an endPresentationTimeDescribed field; when the information about the duration of the part of described media presentation is expressed by a difference between the end time of the part of described media presentation and the start time of the entire media presentation, the information about the duration of the part of described media presentation is expressed by a mediaPresentationDurationDescribed field.

Further, when the metadata file is a last metadata file corresponding to the media presentation, the information about the duration of the part of described media presentation may also be expressed by an endTimePresentation field.

Optionally, when the information about the reference time of updating the metadata file is the information about the duration of the part of described media presentation, to enable the UE to judge in time whether the received metadata file has described the entire media presentation completely and to save network communication resources occupied by the update of the metadata file, the metadata file may further include information indicating that the media presentation has been described completely. The information indicating that the media presentation has been described completely is used to indicate, to the UE, that the metadata file has described the media presentation completely, so that the UE stops sending the request for updating the metadata file.

In this embodiment, the server may determine the information indicated to the UE about the time length of updating the metadata file, according to overlap time between a current metadata file and a metadata file next to the current metadata file. The information indicated to the UE about the time length of updating the metadata file is greater than 0 and less than or equal to the overlap time between the current metadata file and the metadata file next to the current metadata file.

Step 1402: When the UE needs to obtain the metadata file corresponding to the media presentation, the UE sends a message to the server to request the metadata file corresponding to the media presentation.

Step 1403: The server sends the metadata file to the UE according to the received message that requests the metadata file corresponding to the media presentation.

Step 1404: The UE determines a time range of updating the metadata file, according to the information about the reference time of updating the metadata file and the information indicated to the UE about the time length of updating the metadata file, where the two pieces of information is carried in the metadata file.

In this embodiment, when the information about the reference time of updating the metadata file is the information about the time of updating the metadata file by the server, the time range of updating the metadata file, which is determined by the UE according to the information about the time of updating the metadata file by the server and the information indicated to the UE about the time length of updating the metadata file, is: the start time of updating the metadata file by the server to "the start time of updating the metadata file by the server+the time length of updating the metadata file by the UE".

When the information about the reference time of updating the metadata file is the information about the duration of the part of described media presentation, and the information about the duration of the part of described media presentation is expressed by the end time of the part of described media presentation, the time range of updating the metadata file, which is determined by the UE according to the information about the time of updating the metadata file by the server and the information indicated to the UE about the time length of updating the metadata file, is: "the end time of the part of described media presentation−the time length of updating the metadata file by the UE" to the end time of the part of described media presentation.

Step 1405: The UE selects update time of the metadata file in the time range of updating the metadata file, where the time range is determined in step 1404.

Step 1406: The UE updates the metadata file according to the update time of the metadata file determined in step 1405. The update include: Upon arrival of the update time, the UE sends a request for updating the metadata file to the server, where in this embodiment, the request for updating the metadata file is a message for requesting the metadata file corresponding to the media presentation; the UE receives a metadata file returned by the server according to the request for updating the metadata file, and uses the metadata file to update the metadata file stored by the UE.

Further, the method for updating the metadata file provided in this embodiment may further include: The UE judges whether the metadata file has described the media presentation completely, and stops sending the request for updating the metadata file to the server if the metadata file has described the media presentation completely.

In this embodiment, the UE judging whether the metadata file has described the media presentation completely includes two modes:

A first mode is: The UE judges whether the received metadata file includes information indicating that the media presentation has been described completely, and judges, according to a judgment result, whether the metadata file has described the media presentation completely, that is, if the metadata file includes the information indicating that the media presentation has been described completely, the UE judges that the metadata file has described the media presentation completely; otherwise, the UE judges that the metadata file has not described the media presentation completely.

In this embodiment, the information indicating that the media presentation has been described completely may be expressed by an endTimePresentation field. The endTimePresentation field is used to record duration of entire media presentation. The information indicating that the media presentation has been described completely may also be expressed by a flag bit. Definitely, in a practical application, the information indicating that the media presentation has been described completely may be expressed in other modes, and each mode is not detailed herein.

A second mode is: The UE judges whether a message indicating that the media presentation has been described completely is received from the server. If the UE receives, from the server, the message indicating that the media presentation has been described completely, the UE judges that the media presentation has been described completely; otherwise, the media presentation has not been described completely.

In this embodiment, the UE may trigger the server to send the message indicating that the media presentation has been described completely, by sending the message to the server to request the metadata file corresponding to the media presentation, or trigger the server to send the message indicating that the media presentation has been described completely, by sending a query message to the server. Definitely, in a practical application, the UE may use other means to trigger the server to send the message indicating that the media presentation has been described completely. The means are not detailed herein.

The embodiment of the present invention does not restrict the form of the message indicating that the media presentation has been described completely. In a practical application, the message indicating that the media presentation has been described completely may be an independent control signaling, or a blank media data file, or may be in other forms, which are not detailed herein.

Further, the method for updating the metadata file provided in the embodiment of the present invention may further include: The UE generates a media fragment list according to information that is included in the metadata file and is about reference time of updating the metadata file, and obtains a media fragment in the media fragment list.

In this embodiment, the step that, the UE generates the media fragment list according to the information that is included in the metadata file and is about the reference time of updating the metadata file, and obtains the media fragments in the list of media fragments, specifically includes:

First, the UE determines index numbers 1-n of media fragments according to the information about the reference time of updating the metadata file and information about duration of the media fragments, where the two pieces of information is included in the metadata file.

In this embodiment, when the information about the reference time of updating the metadata file is the information about the time of updating the metadata file by the server, n=int ((information about time of updating the metadata file by the server+information that is indicated to the UE and is about a time length of updating the metadata file−start time of the entire media presentation)/information about duration of a media fragment), where int (x) is a rounding function and represents a maximum integer not greater than x, and in this embodiment, x is (information about time of updating the metadata file by the server+information that is indicated to the UE and is about a time length of updating the metadata file−start time of the entire media presentation)/information about duration of a media fragment. When the information about the reference time of updating the metadata file is the information about the duration of the part of described media presentation, n=int (the information about the duration of the part of described media presentation/the information about the duration of the media fragment), where int (x) is a rounding function, and + represents a maximum integer not greater than x, and in this embodiment, x is the information about the duration of the part of described media presentation/the information about the duration of the media fragment.

Then, the UE generates a uniform resource locator corresponding to media fragments whose index numbers are 1-n, and generates a list of media fragments whose index numbers are 1-n according to the uniform resource locator.

Finally, the UE obtains a corresponding media fragment through the uniform resource locator according to the order of the index numbers.

In the method for updating the metadata file according to the embodiment of the present invention, the information about the time of updating the metadata file by the server and the information indicated to the UE about the time length of updating the metadata file are added in the metadata file, so that the UE can determine accurately the time of updating the metadata file, according to the information about the time of updating the metadata file by the server and the information indicated to the UE about the time length of updating the metadata file, so as to solve the following problem that: improper setting of the update period makes the user equipment fail to normally obtain a streaming service when the metadata file is updated periodically in the prior art.

Figure 15:
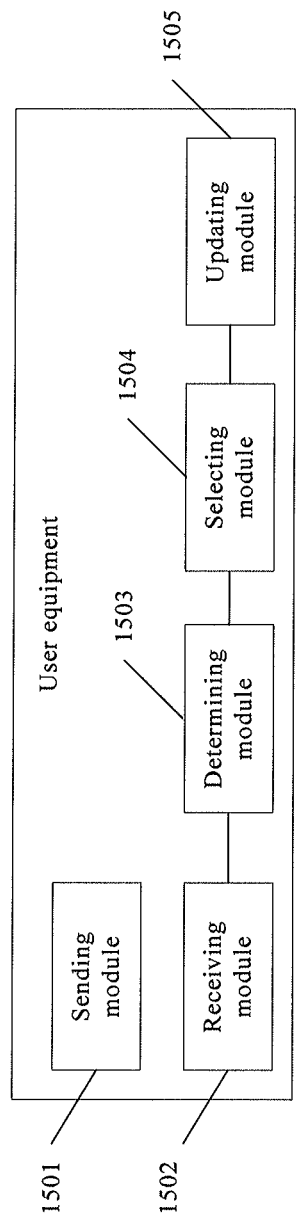
FIG. 15 is a schematic structural diagram of a user equipment according to an embodiment of the present invention.

As shown in FIG. 15, an embodiment of the present invention provides a user equipment, including:

a sending module 1501, configured to send a message to a server on a network side to request a metadata file corresponding to media presentation;

a receiving module 1502, configured to receive a metadata file returned by the server according to the message that requests the metadata file corresponding to the media presentation, where the metadata file includes information about time of updating the metadata file by the server and information indicated to a user equipment about a time length of updating the metadata file;

a determining module 1503, configured to determine a time range of updating the metadata file, according to the information about the time of updating the metadata file by the server and the information indicated to the user equipment about the time length of updating the metadata file;

a selecting module 1504, configured to select update time of the metadata file in the time range of updating the metadata file, where the time range is determined by the determining module 1503; and an updating module 1505, configured to send a request for updating the metadata file to the server according to the update time selected by the selecting module 1504.

For the detailed implementation method of the user equipment provided in the embodiment of the present invention, reference can be made to relevant description about the method for updating the metadata file according to the embodiments of the present invention shown in FIG. 12 to FIG. 14.

It should be noted that in a practical application, multiple modules of the user equipment provided in the embodiment of the present invention shown in FIG. 15 may also be implemented by one module or functional unit with functions similar to functions of the multiple modules, which is not detailed herein.

Through the user equipment provided in the embodiment of the present invention, the time of updating the metadata file can be determined accurately according to the information about the time of updating the metadata file by the server and the information indicated to the UE about the time length of updating the metadata file, where the two pieces of information is included in the metadata file, so as to solve the following problem: Improper setting of the update period makes the user equipment fail to normally obtain a streaming service when the metadata file is updated periodically in the prior art.

An embodiment of the present invention provides a server, including:

a generating module, configured to generate a metadata file corresponding to media presentation, where the metadata file includes information about time of updating the metadata file by a server and information indicated to a user equipment about a time length of updating the metadata file; and a sending module, configured to send the metadata file to the user equipment if a message that requests the metadata file corresponding to the media presentation is received from the user equipment, where the user equipment determines update time of the metadata file according to the information about the time of updating the metadata file by the server and the information indicated to the user equipment about the time length of updating the metadata file.

For the detailed implementation method of the server provided in the embodiment of the present invention, reference can be made to relevant description about the method for updating the metadata file according to the embodiments of the present invention shown in FIG. 12 to FIG. 14.

It should be noted that in a practical application, multiple modules of the server provided in the embodiment of the present invention may also be implemented by one module or functional unit with functions similar to functions of the multiple modules, which is not detailed herein.

Through the server provided in the embodiment of the present invention, the information about the time of updating the metadata file by the server and the information indicated to the UE about the time length of updating the metadata file are added in the metadata file, so that the UE can determine accurately the time of updating the metadata file, according to the information about the time of updating the metadata file by the server and the information indicated to the UE about the time length of updating the metadata file, so as to solve the following problem that: Improper setting of the update period makes the user equipment fail to normally obtain a streaming service when the metadata file is updated periodically in the prior art.

An embodiment of the present invention further provides a communication system, including:

a server, configured to: generate a metadata file corresponding to media presentation, where the metadata file includes information about time of updating the metadata file by a server and information indicated to a user equipment about a time length of updating the metadata file; and send the metadata file to the user equipment if a message that requests the metadata file corresponding to the media presentation is received from the user equipment; and the user equipment, configured to: send the message to the server to request the metadata file corresponding to the media presentation; receive a metadata file returned by the server; determine a time range of updating the metadata file, according to the information about the time of updating the metadata file by the server and the information indicated to the user equipment about the time length of updating the metadata file, where the two pieces of information is included in the metadata file; select update time of the metadata file in the time range of updating the metadata file; and send a request for updating the metadata file to the server according to the update time.

For the detailed implementation method of the communication system provided in the embodiment of the present invention, reference can be made to relevant description about the method for updating the metadata file according to the embodiments of the present invention shown in FIG. 12 to FIG. 14.

Through the communication system provided in the embodiment of the present invention, the server adds the information about the time of updating the metadata file by the server and the information indicated to the UE about the time length of updating the metadata file in the metadata file, so that the UE can determine accurately the time of updating the metadata file, according to the information about the time of updating the metadata file by the server and the information indicated to the UE about the time length of updating the metadata file, so as to solve the following problem that: Improper setting of the update period makes the user equipment fail to normally obtain a streaming service when the metadata file is updated periodically in the prior art.

The method, the apparatus, and the system for updating the metadata file in the embodiments of the present invention are applicable in an HTTP-based streaming service system.

The method or algorithm steps described in the embodiments disclosed herein may be implemented through hardware directly or through a software module executed by a processor, or through both of the hardware and the software module. The software module may be set in a random access memory (RAM), memory, read-only memory (ROM), electrically programmable ROM, electrically erasable programmable ROM, register, hard disk, removable disk, CD-ROM, or any other form of storage media well-known in the art.

The above description is merely exemplary embodiments of the present invention, but not intended to limit the protection scope of the present invention. Any modification, variation or replacement that can be easily derived by those skilled in the art without departing from the technical scope disclosed by the present invention shall fall within the protection scope of the present invention. Therefore, the protection scope of the present invention is subject to the appended claims.

What is claimed is:

1. A method for updating a Media Presentation Description (MPD) implemented by a streaming client comprising a processor, the method comprising:
   receiving a first MPD sent by a streaming server, wherein the first MPD corresponding to a media presentation;
   obtaining, from the first MPD, a time length to wait before requesting a second MPD corresponding to the media presentation, wherein the time length is specified in the first MPD, wherein the media presentation is a media stream, the first MPD describes a first part of the media stream, and the second MPD describes a second part of the media stream;
   determining, according to the time length to wait before request the second MPD and a receive time at which the first MPD is received, an update time for requesting the second MPD; and
   requesting, at the update time, the second MPD from the streaming server.

2. The method according to claim 1, further comprising:
   receiving the second MPD sent by the streaming server, wherein the second MPD specifies a time length to wait before requesting a third MPD corresponding to the media presentation, and wherein the time length specified in the second MPD is different with the time length specified in the first MPD.

3. The method according to claim 1, wherein the step of determining comprises:
   calculating a sum of the value of the time length and the receive time; and
   determining the update time according to the sum.

4. The method according to claim 3, wherein the step of determining the update time according to the sum comprises:
   determining a time range for requesting the second MPD, wherein a start time point of the time range is a time point represented by the sum; and
   selecting the update time for requesting the second MPD from the time range for requesting the second MPD.

5. The method according to claim 1, wherein the first MPD specifies a duration of the first part of the media stream described by the first MPD;
   wherein the step of determining comprises:
   calculating a sum of a value of the duration and the receive time; and
   determining the update time according to the sum.

6. The method according to claim 5, wherein the step of determining the update time according to the sum comprises:
   determining a time range for requesting the second MPD, wherein an end time point of the time range is a time point represented by the sum; and
   selecting the update time for requesting the second MPD in the time range for requesting the second MPD.

7. The method according to claim 1, wherein the first part of the media stream described by the first MPD and the second part of the media stream described by the second MPD have an overlapping area.

8. A streaming client comprising:
   a memory for storing computer executable instructions; and
   a processor operatively coupled to the memory, the processor being configured to execute the computer-executable instructions to:
   receive a first Media Presentation Description (MPD) sent by a streaming server, wherein the first MPD corresponding to a media presentation;
   obtain, from the first MPD, a time length to wait before requesting a second MPD corresponding to the media presentation, wherein the time length is specified in the first MPD, wherein the media presentation is a media stream, the first MPD describes a first part of the media stream, and the second MPD describes a second part of the media stream;
   determine, according to the time length to wait before request the second MPD and a receive time at which the first MPD is received, an update time for requesting the second MPD; and request, at the update time, the second MPD from the streaming server.

9. The streaming client according to claim 8, wherein the processor is further configured to:
receive the second MPD sent by the streaming server, wherein the second MPD specifies a time length to wait before requesting a third MPD corresponding to the media presentation, wherein the time length specified in the second MPD is different with the time length specified in the first MPD.

10. The streaming client according to claim 8, wherein the processor is configured to:
calculate a sum of the value of the time length and the receive time; and
determine the update time according to the sum.

11. The streaming client according to claim 10, wherein the processor is configured to:
determine a time range for requesting the second MPD, wherein a start time point of the time range is a time point represented by the sum; and
select the update time for requesting the second MPD from the time range for requesting the second MPD.

12. The streaming client according to claim 8, wherein the first MPD specifies a duration of the first part of the media stream described by the first MPD;
wherein the processor is configured to:
calculate a sum of a value of the duration and the receive time; and
determine the update time according to the sum.

13. The streaming client according to claim 12, wherein the processor is configured to:
determine a time range for requesting the second MPD, wherein an end time point of the time range is a time point represented by the sum; and
select the update time for requesting the second MPD from the time range for requesting the second MPD.

14. The streaming client according to claim 8, wherein the first part of the media stream described by the first MPD and the second part of the media stream described by the second MPD have an overlapping area.

15. A program storage medium storing a computer program for causing a computer to perform the steps of:
receiving a first Media Presentation Description (MPD) sent by a streaming server, wherein the first MPD corresponding to a media presentation;
obtaining, from the first MPD, a time length to wait before request a second MPD corresponding to the media presentation, wherein the time length is specified in the first MPD, wherein the media presentation is a media stream, wherein the first MPD describes a first part of the media stream and the second MPD describes a second part of the media stream;
determining, according to the time length to wait before request the second MPD and a receive time at which the first MPD was received, an update time for requesting the second MPD; and
requesting, at the update time, the second MPD from the streaming server.

16. The program storage medium according to claim 15, wherein the computer program further causes the computer to perform the step of:
receiving the second MPD sent by the streaming server, wherein the second MPD specifies a time length to wait before requesting a third MPD corresponding to the media presentation, wherein the time length specified in the second MPD is different with the time length specified in the first MPD.

17. The program storage medium according to claim 15, wherein the step of determining comprises:
calculating a sum of the value of the time length and the receive time; and
determining the update time according to the sum.

18. The program storage medium according to claim 17, wherein the step of determining the update time according to the sum comprises:
determining a time range for requesting the second MPD, wherein a start time point of the time range is a time point represented by the sum; and
selecting the update time for requesting the second MPD from the time range for requesting the second MPD.

19. The program storage medium according to claim 15, wherein the first MPD specifies a duration of the first part of the media stream described by the first MPD;
wherein the step of determining comprises:
calculating a sum of a value of the duration and the receive time; and
determining the update time according to the sum.

20. The program storage medium according to claim 19, wherein the step of determining the update time according to the sum comprises:
determining a time range for requesting the second MPD, wherein an end time point of the time range is a time point represented by the sum; and
selecting the update time for requesting the second MPD from the time range for requesting the second MPD.

21. The program storage medium according to claim 15, wherein the first part of the media stream described by the first MPD and the second part of the media stream described by the second MPD have an overlapping area.

* * * * *